United States Patent [19]

Dreher

[11] Patent Number: 4,725,949
[45] Date of Patent: Feb. 16, 1988

[54] INTELLIGENT INTERFACE FOR ELECTRONIC CASH REGISTER

[75] Inventor: Bruce I. Dreher, Droaville, Ga.

[73] Assignee: Supervision Control Systems, Inc., Atlanta, Ga.

[21] Appl. No.: 628,343

[22] Filed: Jul. 6, 1984

[51] Int. Cl.$^4$ ............................................. G07G 1/12
[52] U.S. Cl. .................................... 364/405; 400/279
[58] Field of Search ........................ 235/379; 364/405; 400/77, 78, 6, 279, 280, 281, 282; 101/110

[56] References Cited

U.S. PATENT DOCUMENTS

| | | | |
|---|---|---|---|
| 3,932,842 | 1/1976 | Kennavane | 364/900 |
| 4,237,483 | 12/1980 | Clever | 364/405 |
| 4,330,217 | 5/1982 | Churgovich | 364/139 R |
| 4,343,012 | 8/1982 | Knapp | 400/279 |

Primary Examiner—Jerry Smith
Assistant Examiner—G. Hayes
Attorney, Agent, or Firm—Jones & Askew

[57] ABSTRACT

An intelligent data acquisition interface for deriving and decoding data from the interface between a printer driver and a printing mechanism in an electronic cash register is shown. The apparatus is responsive to a wide variety of predetermined character position timing pulses available for various types of electronic cash registers (ECRs) to decode the characters as appropriate control signals are provided to the printing mechanism. As the apparatus collects and decodes data, it is loaded into a buffer within a microprocessor. When the device detects the provision of a complete print row of material for the receipt on the ECR, the contents of the buffer is transmitted serially, preferably in ASCII coded format, to a utilization system over a standard 9600 baud serial data link. The device is controlled by a microprocessor 65 having a program memory, and ECR specific look-up tables stored in an interchangeable PROM.

6 Claims, 11 Drawing Figures

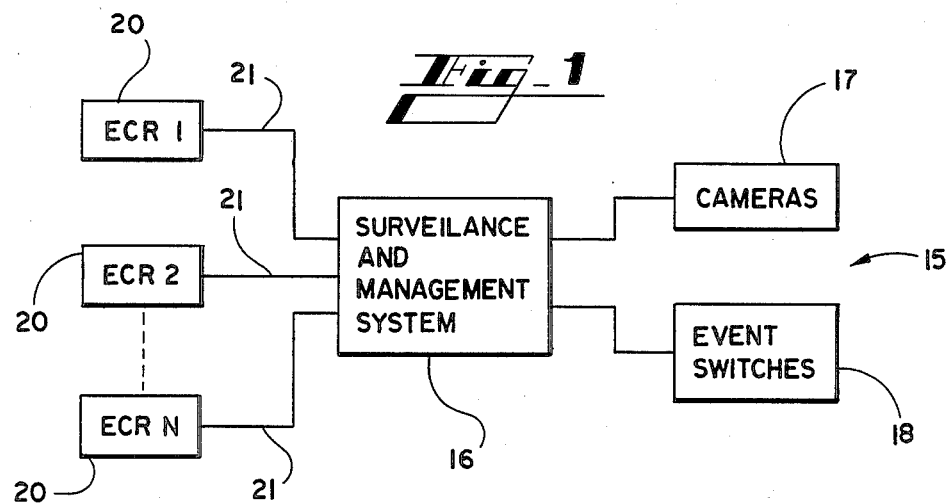
Fig_1
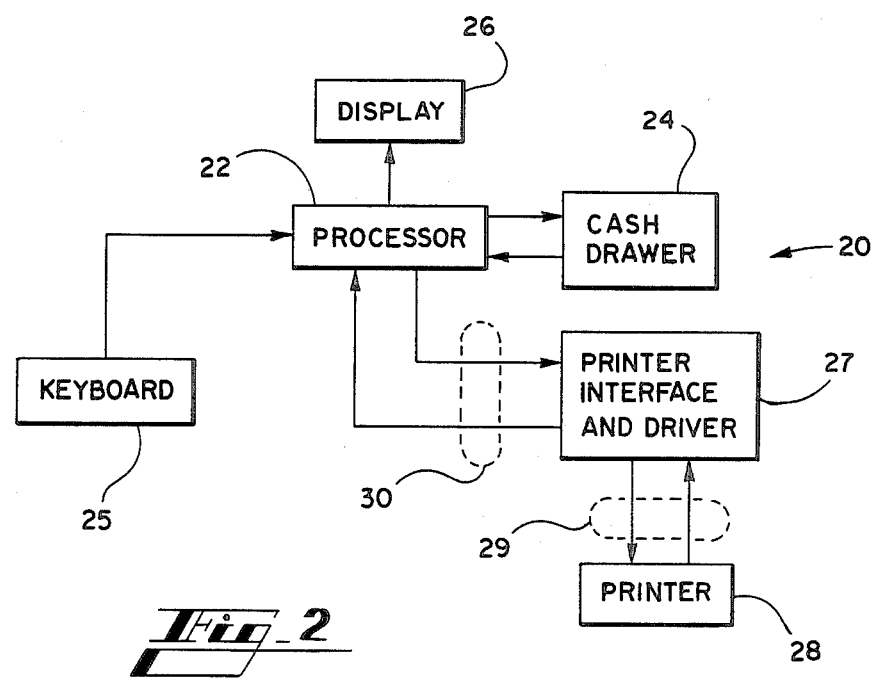
Fig_2

|   | 14 | 13 | 12 | 11 | 10 | 9 | 8 | 7 | 6 | 5 | 4 | 3 | 2 | 1 |   |
|---|----|----|----|----|----|----|----|----|----|----|----|----|----|----|---|
| 0 | O | O | O. | O | O | O. | O | O | O. | O | O | O | GS | GT | 0 |
| 1 | 1 | 1 | 1. | 1 | 1 | 1. | 1 | 1 | 1. | 1 | 1 | 1 | CA | TL | 1 |
| 2 | 2 | 2 | 2. | 2 | 2 | 2. | 2 | 2 | 2. | 2 | 2 | 2 | CK | @ | 2 |
| 3 | 3 | 3 | 3. | 3 | 3 | 3. | 3 | 3 | 3. | 3 | 3 | 3 | CH | CPN | 3 |
| 4 | 4 | 4 | 4. | 4 | 4 | 4. | 4 | 4 | 4. | 4 | 4 | 4 | MS | VD | 4 |
| 5 | 5 | 5 | 5. | 5 | 5 | 5. | 5 | 5 | 5. | 5 | 5 | 5 | R/A | ID | 5 |
| 6 | 6 | 6 | 6. | 6 | 6 | 6. | 6 | 6 | 6. | 6 | 6 | 6 | PO | RTN | 6 |
| 7 | 7 | 7 | 7. | 7 | 7 | 7. | 7 | 7 | 7. | 7 | 7 | 7 | NS | TND | 7 |
| 8 | 8 | 8 | 8. | 8 | 8 | 8. | 8 | 8 | 8. | 8 | 8 | 8 | % | CG | 8 |
| 9 | 9 | 9 | 9. | 9 | 9 | 9. | 9 | 9 | 9. | 9 | 9 | 9 | TF | ST | 9 |
| A | BR | CL | # | PLU | NO. | P | X | Z | LBS | Kg | X | CUS | T/M | + | A |
| B | EX | — | — | — | — | — | — | — | — | — | — | ½ | PB | — | B |
| C | TM | ★ | ★ | ★ | ★ | ★ | ★ | ★ | ★ | ★ | ★ | ITM | TX | SI | C |
|   | 14 | 13 | 12 | 11 | 10 | 9 | 8 | 7 | 6 | 5 | 4 | 3 | 2 | 1 |   |

Fig_3

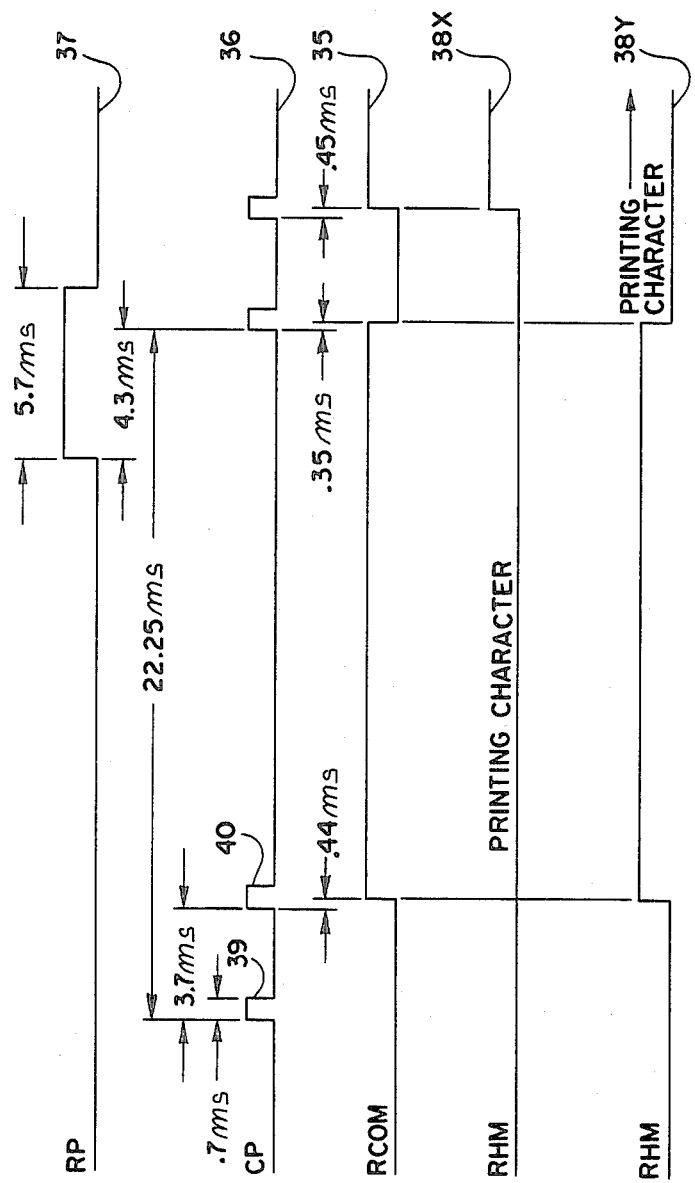

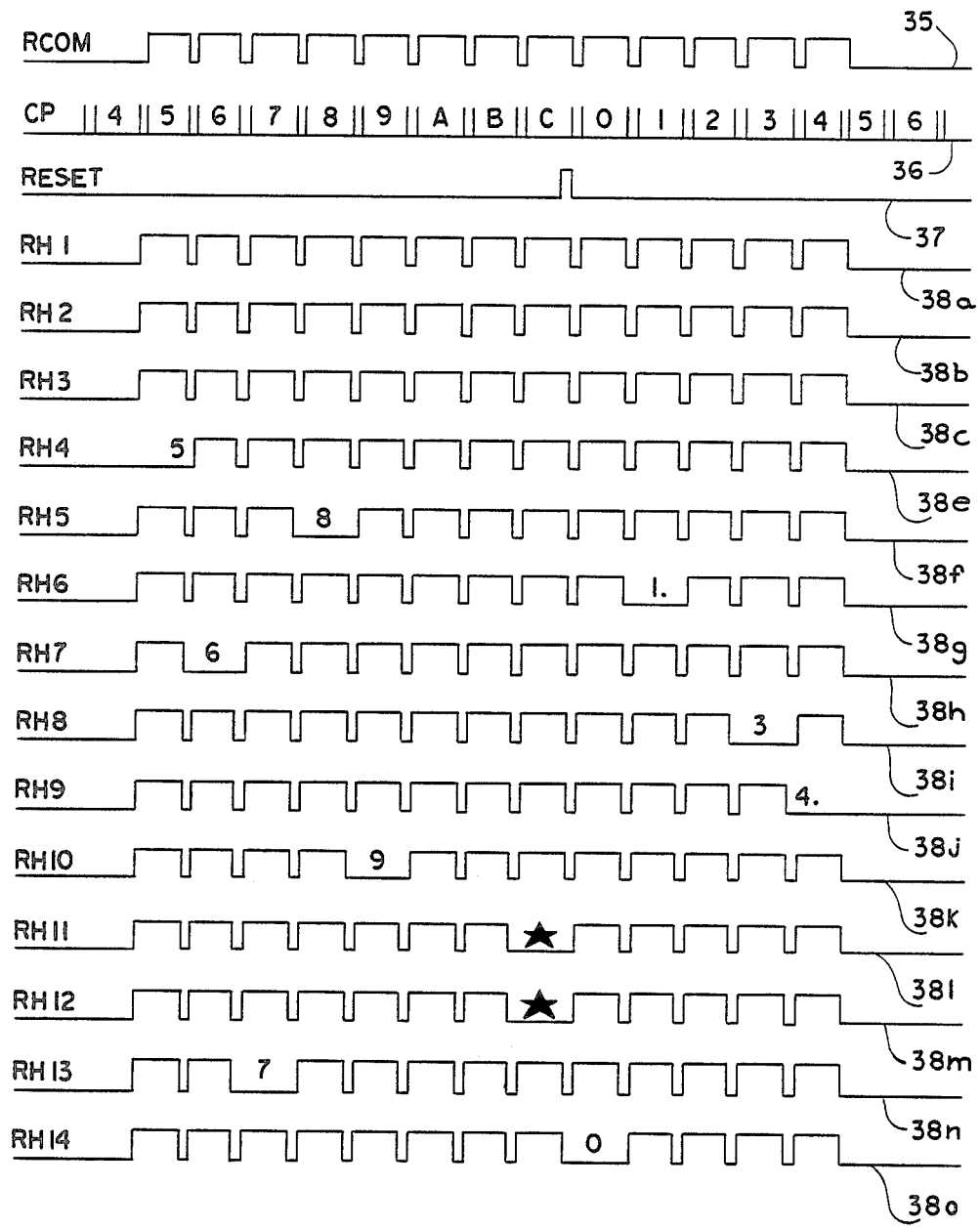
Fig_5A

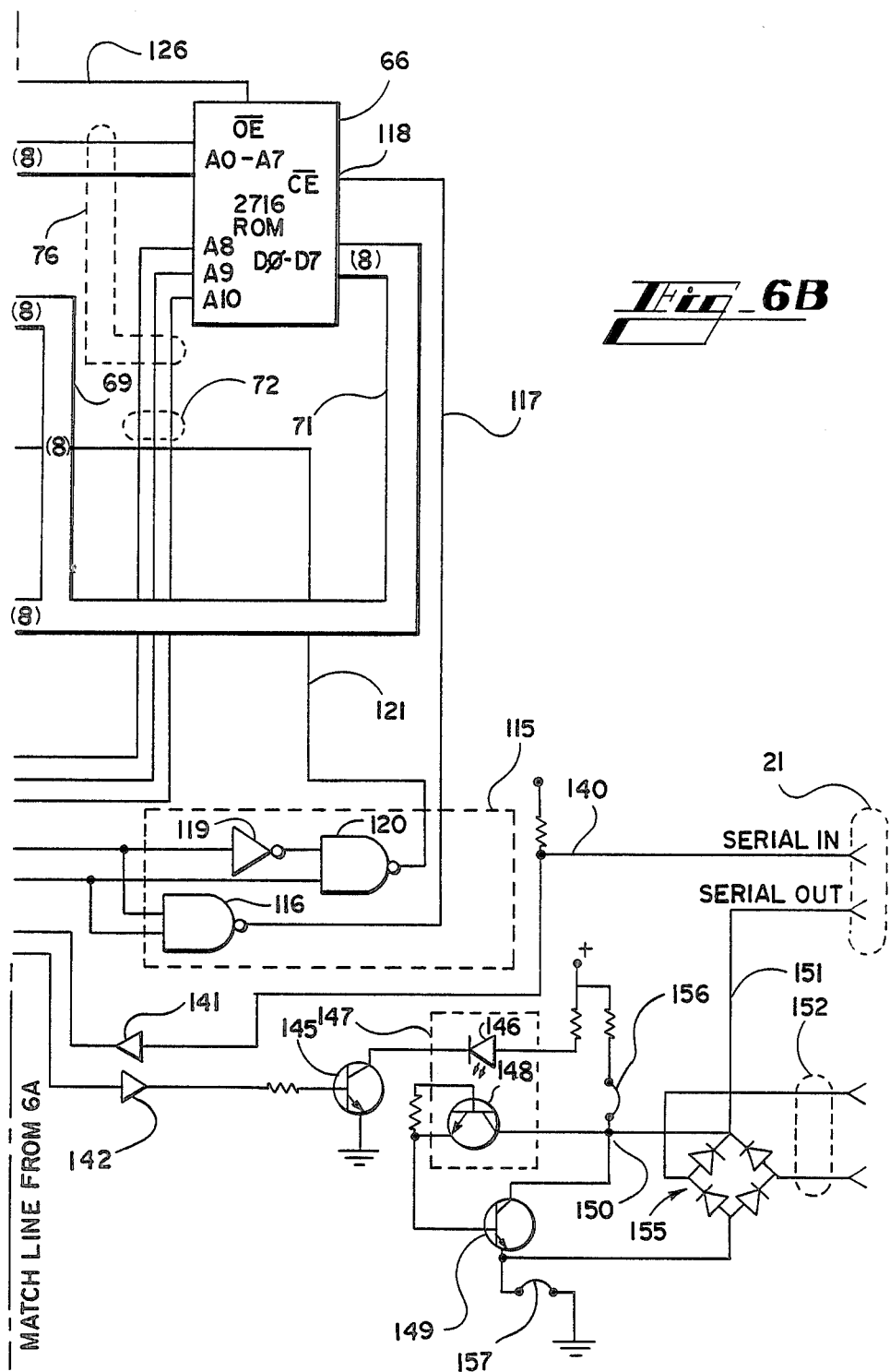
Fig_6B

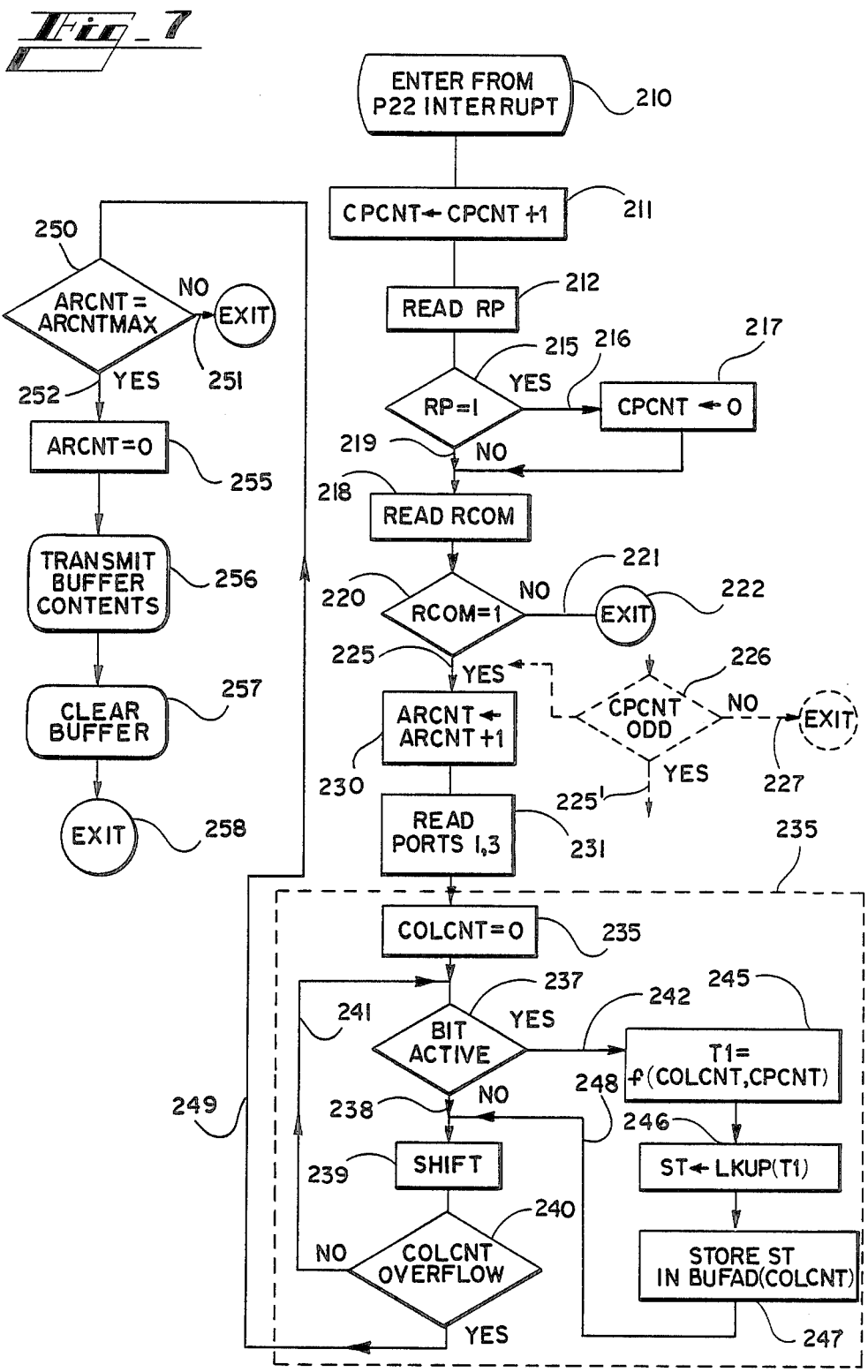

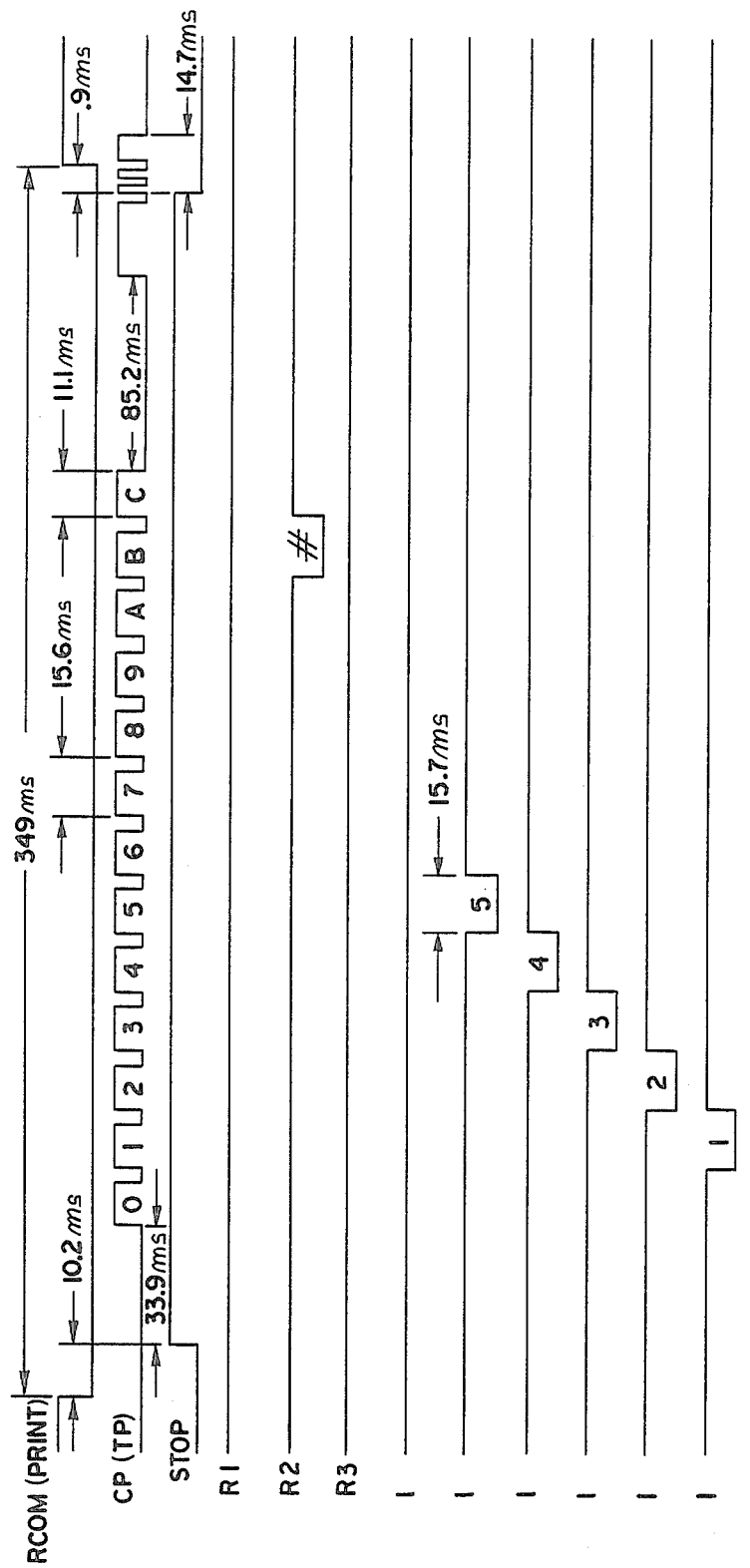

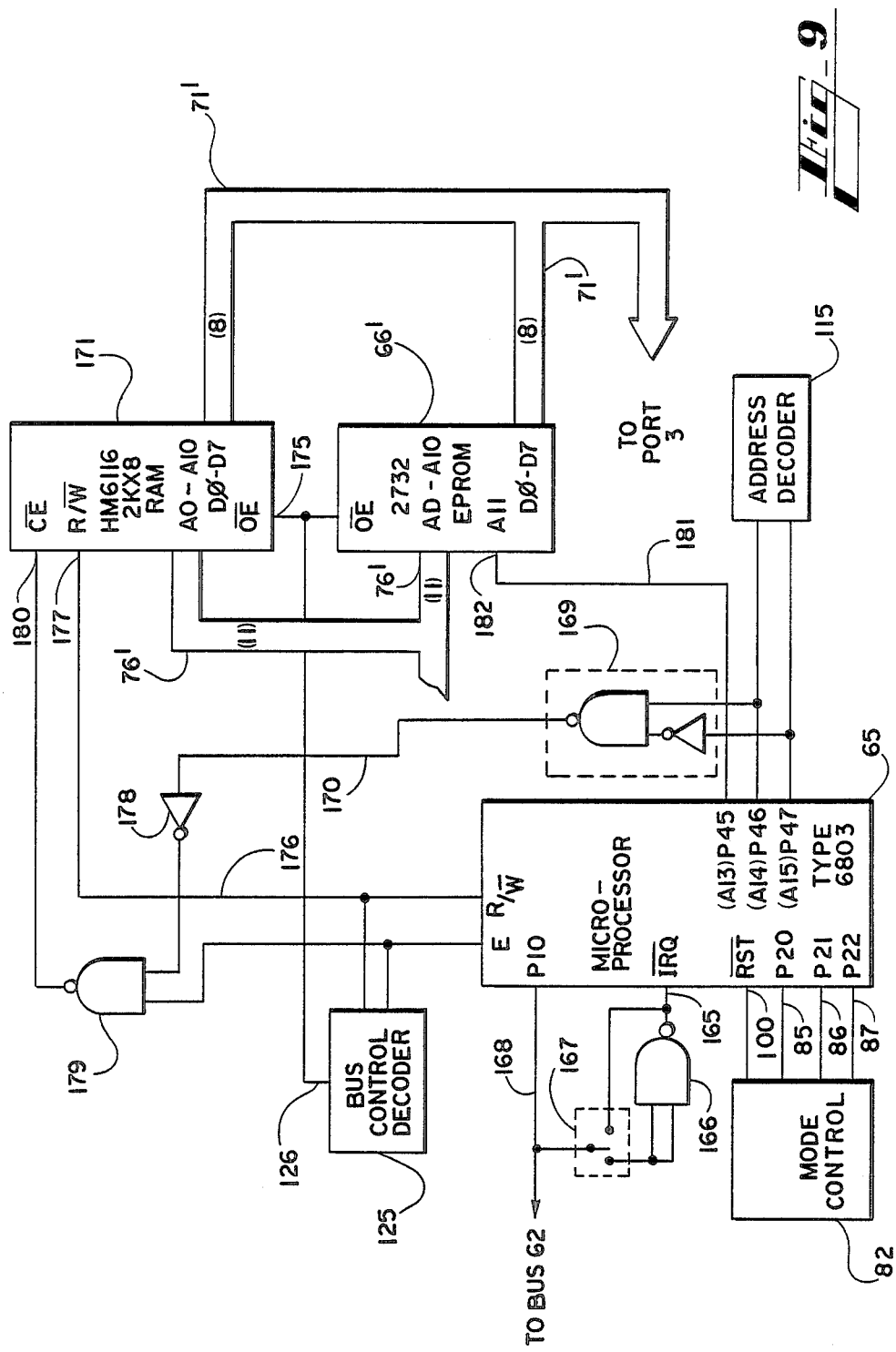

INTELLIGENT INTERFACE FOR ELECTRONIC CASH REGISTER

TECHNICAL FIELD

The present invention relates to an interface for connecting an electronic cash register to a surveillance and management system for use at a place of business, and in particular discloses a novel interface for providing ASCII encoded data to a utilization system such as a surveillance system from signals provided to and from a variety of different types of printing devices commonly used in electronic cash registers.

BACKGROUND OF THE INVENTION

In recent years, surveillance systems have become popular in a number of retail establishments in addition to their more traditional use for monitoring warehouses, military installations, and the like. The rapid decline in the cost of electronic components and the increasing sophistication of each electronic component per unit cost, has made the use of sophisticated surveillance systems in a wide variety of establishments practical.

In addition to their more traditional roles as devices for detecting theft, retaining visual records of robbers and the like, more advanced surveillance systems, for example the type shown in copending application Ser. No. 583,045 filed Feb. 23, 1984 and entitled "IMPROVED SURVEILLANCE SYSTEM", which is assigned to the assignee of the present application, have become useful tools for improving the profitability of retail operations.

It has been found by the users of modern surveillance and management systems of the type disclosed in the above-referenced copending application that such systems are extremely useful for monitoring the habits of employees so that good work habits, both in terms of customer relations, and in terms of operating of the cash drawer so as to reduce the opportunities for thefts, can be established. A common use of such surveillance systems includes monitoring operation of retail establishments for employee dishonesty and proper employee procedures when specified amounts of cash are accumulated in a cash drawer. Many such surveillance management systems use video tape recording devices operating in a time lapsed mode. It is known in the art to interface an electronic cash register (ECR) at a monitored location with a decision-making apparatus controlling a video tape recorder so that the nature of certain transactions from the cash register may be either recorded, or saved on video tape. For example, a system shown in U.S. Pat. No. 4,145,715 to Clever shows an arrangement in which data provided from an electronic cash register is provided to a microprocessor. Predetermined alarm conditions are defined such as too low an average price per item, or too low a price for a particular department, which will activate the recording device.

However, in addition to the more traditional functions of controlling cameras and recorders, the system described in the above-reference copending patent application is also useful for monitoring other activities of store employees. For example, that system can maintain a running net balance for the amount of money in a cash drawer at a retail convenience store. Standard operating procedures in many such stores require that once a predetermined amount of cash is present in the drawer, a "money drop" into a safe should take place. This is because such establishments are often targets for robberies. This, in addition to merely operating cameras and recorders, that particular system can also store information concerning the time between the last sale which produces the requisite predetermined amount of cash in the drawer and the time a money drop takes place. The failure of the money drop to take place within a predetermined acceptable time limit can generate a condition which will be brought to the attention of the management in a report which the system generates.

In order to generate such reports, as well as to control cameras and recorders so that suspect transactions may be recorded for later viewing, it is necessary that a system controller have access to data indicating activities at the electronic cash register. As noted above, it is known in the art to interface an electronic cash register to a decision-making system in order to acquire such data.

Several years ago, sellers of surveillance systems were often in a position in which they had to provide a particular type of electronic cash register as well as the other surveillance equipment as part of an entire system for monitoring transactions at a retail establishment. This, of necessity, increased the entire system cost to the prospective purchaser, and also presented such prospective purchasers with a decision of whether to abandon use of fully functional and otherwise acceptable cash registers.

It is within the level of skill in the art to interface a given electronic cash register with a given processor system. However, each combination of surveillance system and electronic cash register required a custom device for making the interface. As with any custom designed device, the requirement for such a device, both in design time and in production of a relatively small quantity, increase the cost.

This situation is exacerbated by the fact that most sellers of surveillance and management systems for monitoring locations with electronic cash registers are in the position of selling their systems as retrofit items. In other words, a large number of their potential customers already have selected particular electronic cash registers. They are normally not anxious to incur the cost of providing a different type of cash register, in terms of both capital cost and employee training time, or the cost of having custom interfaces designed for the particular system and the particular cash register.

While many different varieties of ECRs have different characteristics for the signals driving displays and printing devices, there are a number of common factors in the signals driving such components in most ECRs. It has been discovered by the inventor of the present invention that there is a commonly definable set of character timing pulses which are generated by a wide variety of printing mechanisms used in ECRs. Thus, there is a need in the prior art to provide an interface which will interface a wide variety of electronic cash registers to a surveillance system for the gathering of data about transactions at the ECRs. The present inventor has discovered the above-noted common set of character timing signals and has chosen the American Standard Code for Information Interchange (ASCII) as an output format to thus create a universal data acquisition interface for connecting an ECR to a surveillance, monitoring or management system, which overcomes the above-noted drawbacks of the prior art.

SUMMARY OF THE INVENTION

The present invention overcomes these drawbacks by providing an intelligent data acquisition interface which includes a processor controlling a buffer memory. Also included is a program memory which provides program instructions for operating the processor to acquire data from signals provided to and from the printer in a wide variety of electronic cash registers. The program memory also includes look-up tables for providing ECR specific character values in response to a certain sequence of signals received from the ECR printer apparatus. In other words, the program memory is provided with information on the particular printer used in the particular type of ECR which allows the processor to properly interpret signals received from the printer as corresponding to the printing of particular digits or characters while a transaction is in progress. The combination of processor and program memory interprets these signals into characters corresponding to the printed receipt being provided by the ECR and stores same in a buffer memory. When the interface detects that a complete print row of characters has been printed on the receipt, the contents of the buffer are transmitted out over a communications link to a utilization system which, in the environment of the invention, is normally a surveillance system. In its preferred form, an asynchronous serial data communications link in which the data transmission lines conform to RS232 is used.

In one preferred form of the present invention, the program memory is provided in replaceable read only memories. In this embodiment, information about the particular type of electronic cash register in use is provided in the ECR specific table within the program memory. Thus, the only part which must be changed in order to use an embodiment of the invention to interface any ECR with any utilization system which can accept ASCII coded asynchronous serial data transmissions is a change of the read only memory.

In another embodiment of the present invention, the interface will interrogate, upon reset, the utilization system for information concerning the nature of the ECR connected to the interface. In this embodiment, utilization system downloads a portion of the ECR specific table to the interface.

In its most preferred form, the present invention is readily usable with the two most common type of electromechanical printers used in ECRs today. Each of these printer types include a plurality of rotating print wheels, each having a specific character at a specific character position. In a first type of such printers, all wheels rotate synchronously, and a print hammer magnet is activated when the particular character position is aligned with ribbon and paper. In a second type of such printer, all print wheels start rotation from an initially stopped home position. In response to signals from the processor of the ECR, character position magnets are activated which cause a pawl to catch a ratchet wheel connected to the appropriate print wheel, stopping each individual print wheel at an appopriate position. At the end of a printing cycle in which the print wheels have had sufficient time to rotate to their farthest position, to thus allow printing of the character farthest from the initial position, a platen is rotated to cause paper and ink to strike the aligned print wheels. When this operation is completed, all ratchets are released and the print wheels return to their home position.

The inventor has discovered that both types of printing mechanisms provide a common set of signals which, with some ECR specific information, can be used to decode precisely the line of print provided by the ECR. When a complete print line has been acquired and decoded, serial transmission of the complete print line is provided out over the communications link.

In one preferred form, particularly useful with the first type of printer described above, the processor keeps track of the common character position of each of the print wheels by providing a counter which is reset upon each occurrence of a reset pulse provided by the printing mechanism. The interface also provides a second counter which keeps track of the number of row, or character, positions which have rotated past a predetermined position since initiation of a print cycle. Each time a hammer magnet activation signal is received, the count of these two counters, together with the ECR specific look-up table, is used to determine the character printed at a particular position.

Thus, it is an object of the present invention to provide a universal intelligent interface for interfacing a plurality of different types of electronic cash registers to any utilization system which may make use of data encoded in a standard format.

It is a further object of the present invention to provide an electronic cash register interface which will transmit information corresponding to that printed on an ECR receipt, to a utilization system in an ASCII encoded format, one line at a time, so that the utilization system may immediately respond to the transaction taking place at the ECR.

It is a further object of the present invention to provide an intelligent interface for an electronic cash register and a utilization system which requires only replacement of a logic array and a cable connector, preferably embodied as a read only memory, when the type of ECR with which the interface is used changes.

It is a further object of the present invention to provide a universal interface which may be provided to customers at a greatly reduced cost with respect to custom designed interfaces commonly used in the past.

That the present invention meets these objects, and overcomes the drawbacks of the prior art noted above will be apparent from the detailed description of embodiments of the invention below.

BRIEF DESCRIPTION OF THE DRAWINGS

FIG. 1 is a block diagram of a typical environment for the present invention.

FIG. 2 is a block diagram of the elements of a typical electronic cash register to which embodiments of the present invention will connect.

FIG. 3 shows the characters at each character position for each print wheel for an exemplary electronic cash register printer.

FIG. 4 shows a line of printed characters which is printed in a particular example described in connection with FIG. 5A.

FIG. 5A is a timing diagram showing signals provided to the input port of the preferred embodiment in printing the print line shown in FIG. 4.

FIG. 5B is a timing diagram showing an expanded portion of some of the signals shown in FIG. 5A.

FIG. 7 is a flow diagram of the logic of the program instructions controlling the preferred embodiment of the present invention.

FIG. 8 is a timing diagram showing the signals derived from a second type of printing mechanism commonly used in electronic cash registers.

FIG. 9 is a schematic diagram of a second preferred embodiment of the present invention.

DETAILED DESCRIPTION

Figure 6A:
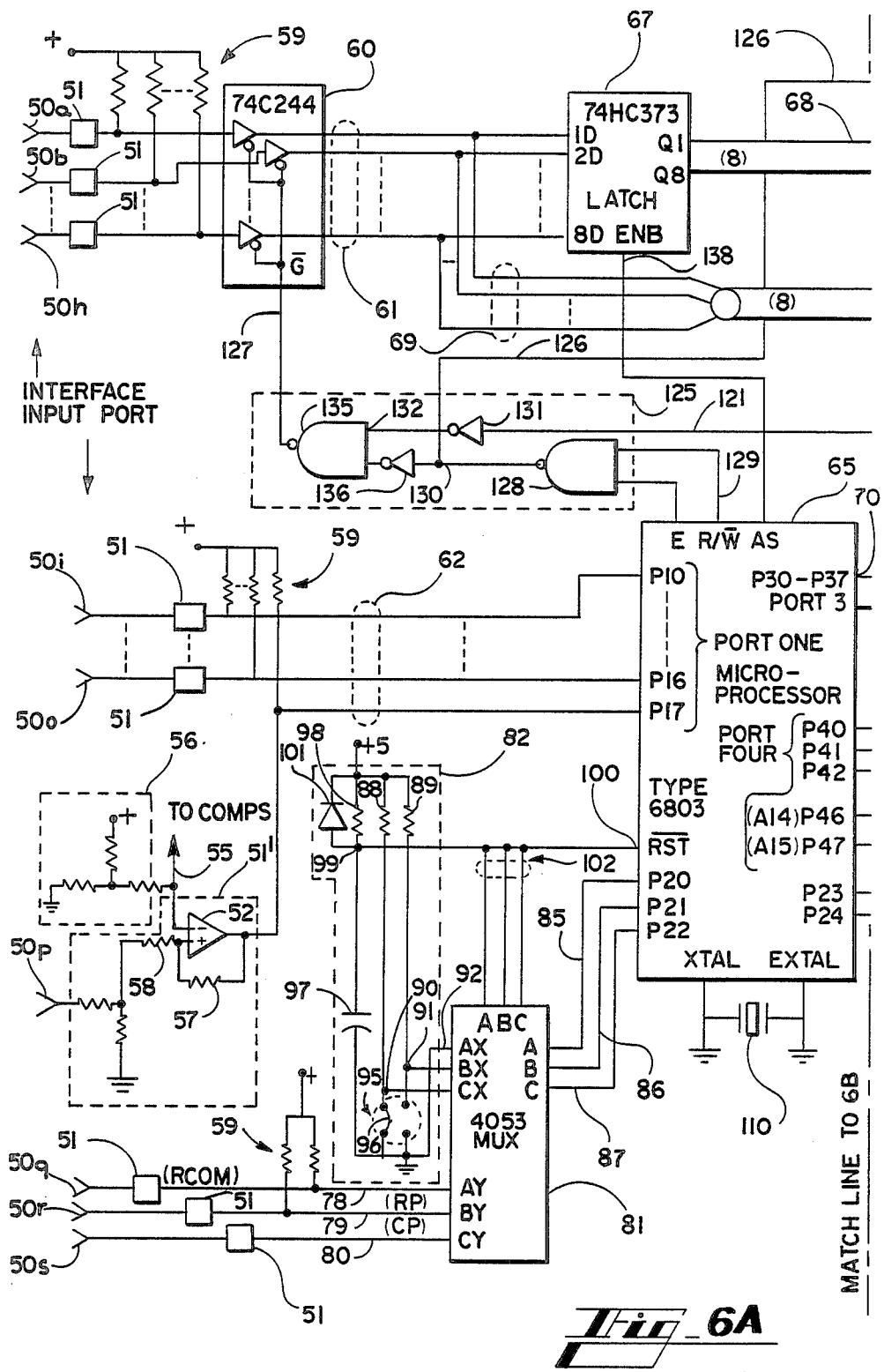
FIG. 6 consisting of FIG. 6A and 6B is a schematic diagram of the preferred embodiment of the present invention.

Turning next to the drawings in which like numerals represent like parts, several preferred forms of the present invention will now be described. FIG. 1 shows a typical environment in which the present invention is utilized. An overall surveillance and management system 15 includes a surveillance and management system controller 16. A plurality of cameras 17 and event switches 18 are connected to the surveillance and management system in a conventional fashion. It should be understood that surveillance and management system 16 is generically a utilization system to which the present invention is designed to be attached.

A plurality of electronic cash registers (ECRs) 20 are connected to controller 16 over a plurality of communication links 21. As noted above, it is one of the objects of the present invention to provide a universal interface which provides standard serial or parallel connections to embody communication links 21. In its most preferred form, the present invention implements communication links 21 using a twisted pair carrying data at 9600 baud, with the interfaces between communication link 21 and ECR 20 and controller 16 meeting the transmit data and receive data specifications of RS-232. Of course, other arrangements, including parallel communication arrangements, may be used to implement embodiments of the present invention.

Turning next to FIG. 2, a block diagram of a typical ECR 20 is shown so that the environment of the present invention may be further understood. Typically, a modern ECR 20 includes a processor 22 which controls the device. A keyboard 25 provides operator input to the processor. A display 26, normally vacuum fluorescent or LED, provides the customer with a visual indication of the transaction of the transaction being run on the ECR. The processor controls opening of a cash drawer 24 and responds to signals indicating the state of the cash drawer.

Processor 22 is also linked to a printer interface and driver 27, which in turn is connected to a printing device 28 via a two-way communication link 29. Printer interface and drive 27 typically accepts information from processor 22 defining what should be printed on a receipt in response to a transaction entered at keyboard 25. Communication link 29 provides driving signals from printer interface 27 to printer 28. Printer 28 typically provides signals back to interface driver 27 in the form of timing signals indicating print wheel positions. This arrangement is used in both of the common types of print wheel printers described hereinabove. It should be appreciated, as described hereinbelow, that printer 28 may be embodied as a dot matrix printer.

Since circuitry embodying printer interface and driver 27 is normally found on a printed circuit board and printer 28 is normally a separate electromechanical unit included within ECR 20, it will be appreciated that link 29 is, in most cases, physically embodied by a ribbon cable with plug connectors.

Thus, it will be understood that the preferred embodiment of the present invention is one which makes a parallel tap to communication link 29 in order to derive information from the communication link concerning what is being printed on a receipt and thus the nature of the transaction entered at keyboard 25. Since it is preferred to provide a parallel tap to communication link 29, the input port for the preferred embodiment is designed to provide a high input impedance so as not to unduly load communication link 29.

It should also be understood that it is possible to construct, and in fact one embodiment of the present invention is constructed, in which the input port to the present invention is tapped off communication link 30, a bus from processor 22 to printer interface and driver 27. This arrangement has been found to be useful in connecting embodiments of the present invention to certain types of dot matrix printers. However, in all forms of the present invention the principles are the same; and the common arrangement of the circuitry shown in the drawings described hereinbelow evidence the universal nature of the interface of the present invention.

The principal example used in describing a preferred embodiment of the present invention will be of interfacing an embodiment of the present invention to the first type of print wheel mechanism described hereinabove. This is a printing device in which a plurality of printwheels, each having a plurality of print wheel character positions are rotated simultaneously and in synchronism. A striking hammer is provided for each print wheel which, when activated, causes the character then at the appropriate position to be urged in a forward direction to impact the character font on an inked ribbon and paper. Since the wheels spin in synchronism, the same character position (but not necessarily the same character) is aligned at the printing position for each wheel simultaneously.

When a typical printer interface and driver operating such a device is used, a line of print is set up in a buffer in the interface. Once the set up times have been met, the printer interface will provide signals to the printer indicating that printing will commence. Electromechanical devices connected to the drum carrying the spinning printwheels provide two character position timing signals back to the interface and driver 27. These character position signals include a signal commonly referred to as a reset pulse (RP), indicating that a reference or home position has been reached during rotation of the print wheel carrying drum. Additionally, devices provide one or more pulses indicating the arrival of each character position on the print wheel at the print position.

Printer interface and driver 27 for these types of printing mechanisms then provide appropriate signals to the hammer magnets behind each print wheel. The hammer magnet signals are activated at the apppropriate times to cause the proper character to be printed for each wheel.

Once the drum carrying the print wheels has made a complete rotation from a starting position, an entire line will have been printed and the printer interface and driver can then provide signals causing the receipt paper to advance, preparing to provide the next line of print signals to printer 28.

In many ECRs in use today, it should be understood that the starting position referred to above is arbitrary. In other words, the starting position for any given line of print is not necessarily the same as the reference position which produces the RP synchronizing signal. Thus, when printer interface 27 has met its necessary set-up times for data received from processor 22, it will begin providing information to printer 28 over communication link 29 for a time period corresponding to one complete rotation of the print wheels from the arbitrary starting position at the time such communication began.

Thus, in constructing an intelligent interface to derive proper information from such signals, it is necessary to keep track of both the print wheel character positions (which may be determined from the reset signal RP and the character position (CP) voltage pulses) and the time of occurrence of the hammer magnet activation signals. Thus, it is in connection with such a printing device that the primary example of operation of the preferred embodiment will now be described.

Turning next to FIG. 3, a print wheel pattern for an actual ECR printer of the type described above is shown. The example shown includes fourteen print wheels numbered from right to left as 1–14. Thus, in the convention adopted in this description, each print wheel constitutes an individual column. Each of the print wheels is provided with thirteen characters. Thus, each character position on a print wheel corresponds to one of the rows shown on FIG. 3, such rows being numbered with hexadecimal digits 0–C. Thus, it should be understood that taking one of the columns shown in FIG. 3, and connecting it in a circular loop where the top of character position 0 is attached to the bottom of character position C will give a visual representation of the characters on the print wheel. Of course, it should be understood that viewing such a hypothetical arrangement requires that the characters as shown in FIG. 3 be rotated left to right 180°. In other words, what is shown on FIG. 3 is the character actually printed and should not be considered to be a photographic representation of what an observer would see looking directly at the face of the print wheel.

From observing FIG. 3, several things will be immediately apparent. First, the preponderance of characters on the print wheels shown in FIG. 3 are members of the character set defined for the American Standard Code for Information Interchange (ASCII). Other notations included at each character position fall into two categories. The first is one for which multiple lettered characters are actually printed for a single character position, such as those shown in rows 0 and 1 for columns 1 and 2. Other characters embodied on the print wheel are ones for which there is no standard ASCII code, for example the stars which appear on columns 4–13 of row C.

Also, some of the numerical characters on the character fonts at specific character positions include a decimal point following the digit to be imprinted.

It is a matter of design choice as to whether a parity bit is used to indicate the presence or absence of a decimal point or whether the user should program the utilization system 16 (FIG. 1) to recognize that a digit printed at a particular column position also includes a decimal point. The latter approach is preferred by the inventor of the present invention. This may be accomplished because, in the preferred form, dummy characters (corresponding to blanks) are transmitted to the utilization system for each column position in which no character was printed for a given print row. Thus, the integrity of the character positions (corresponding to column shown in FIG. 3) is maintained in the data transmitted to utilization system 16. It is a straightforward matter of design of an appropriate controller for the utilization system 16 to cause it to recognize that, for example, the receipt of an ASCII encoded digit from column 6 (FIG. 3) should be followed by a decimal point.

In transmitting characters for character positions in which the type font actually contains a plurality of characters, the designer can translate either a predetermined code, or a pair of ASCII encoded signals corresponding to the two characters which appear at the printed position. In the preferred embodiment, the latter approach is used.

For printed characters on the print wheels, such as the stars shown on row C on FIG. 3, the present inventor has adopted an arrangement of sending "tokens" in the encoded data back to utilization system 16 (FIG. 1). The tokens can either be ignored, as non-ASCII code characters by the utilization system or, the utilization system can be provided with a look-up table for a plurality of token signals. Thus, part of the ECR specific signals to be defined for a given set of print wheels on an ECR is the nature of the non-ASCII characters included on the print wheels. In some embodiments, an expanded ASCII code set is used where lower case ASCII characters are given their conventional meaning as defined by the standard, and upper case characters correspond to tokens which may be decoded by the utilization system. Of course, other arrangements for handling occurrence of non-ASCII characters will suggest themselves to those skilled in the art.

The specific example shown in FIG. 3 shows print wheels used in several ECRs of the type TEC MA-135, 136, 140 and 190 series. The particular printer signals described in the balance of this example come from the printers associated with these types of ECRs.

An exemplary print line is shown in FIG. 4. This exemplary print line includes characters printed in column positions (or print wheels) 4–14. It is the printing of this print line on a receipt tape which is described in connection with the timing diagrams of FIG. 5A.

Turning next to FIG. 5A, a timing diagram of the signals provided at interface 29 (FIG. 2) from printer interface and driver 27 and printer 28 is shown. The nature of the signals is as follows. The signal denoted RCOM on line 35 is a common enabling signal provided by interface driver 27 when printing of a line is in progress. As shown in FIG. 5A, RCOM for the particular type of printer shown is one which provides a high pulse for each of the thirteen character positions corresponding to complete rotation of a print wheel. As described hereinbelow, other types of printers provide a corresponding RCOM signal which goes active and remains active for the entire printing cycle. It should be understood that as used herein, the term printing cycle refers to the printing of an entire line of print, or print row such as that shown in FIG. 4.

A pair of character pulses, CP, is provided as delimiters between each of the character positions as the wheel rotates. These character pulses are derived from electromechanical devices attached to the drum carrying the print wheels. Thus, these signals may be, and are, used to synchronize transfer of data to the printer with the actual physical location of the wheels as the drum spins.

The reset signal (RP) shown on line 37 is also electromechanically derived from the spinning drum. As may be seen from FIG. 5A, the occurrence of a reset pulse indicates that row (or character) position 0 is the next character approaching the print position.

The timing signals on lines 38a-38o are the receipt hammer magnet signals controlling the print hammers for each wheel. Thus, there is one hammer signal for each column which is designated as RH1-RH14. From inspection of FIG. 5A, it will be apparent that the receipt hammer magnet signals are synchronous to the RCOM signal on line 35. It should be appreciated that the hammer signals are active low, and thus a particular hammer is activated when the signal on a particular receipt hammer line remains low during the high portion of the RCOM signal.

As noted above, printers of the type described in this example begin printing when the printer interface data is set up. Thus, once the printer interface has determinaed that it is ready to begin a print line, it takes RCOM high for the appropriate amount of time corresponding to a complete rotation of the print wheel drum from an arbitrary starting position. In the example shown in FIG. 5A, character position (or row) 5 is assumed to be in the print position when RCOM first goes high. Thus, printer interface 27 (FIG. 2) provides an active low signal for receipt hammer 4 shown on line 38e in FIG. 5A. This causes the digit 5 to be printed in column 4.

The next character position to be reached is character position 6. Again viewing FIGS. 3, 4 and 5A together, it may be seen that the digit 6 is to be printed in column 7 on the print row shown in FIG. 4. From FIG. 3 it may be appreciated that column 7 contains the digit 6 at character position 6 and thus the receipt hammer for column 7 (as shown on line 38h) is activated for the next character position.

From the foregoing, it may be readily appreciated that each of the characters shown in FIG. 4 will be printed when the appropriate character position is aligned in the appropriate column in the manner described above.

In order to fully understand operation of a printer of this type, and what sort of data it will provide to the preferred embodiment, two more features should be pointed out. First, from observing timing signals on lines 38l and 38n, it will be appreciated that more than one receipt hammer signal may be active for any specific character position. In the particular example, the stars which appears in columns 11 and 12 are printed simultaneously when the drum rotates around to character position C. Also, columns for which no character is printed never have the receipt hammer signal active during the entire rotation. Examples of these are shown for receipt hammers 1-3, the timing signals for which appear on lines 38l4 38c. Lastly, there are character positions, such as character position A, for which no printing will take place during the printing of a typical print line such as that shown in FIG. 4.

In order to fully understand the operation of the preferred embodiment in connection with this particular type of printer, it is appropriate to turn next to FIG. 5B. FIG. 5B is an expanded scale timing diagram showing the relationships among signals RP, CP, RCOM, and some exemplary receipt hammer signals for printing and nonprinting characters occurring at character positions C and O. The exemplary receipt hammer signals are designed 38x and 38y.

It should be noted from FIG. 5B that, for the particular printer described in this example, the first of the two character pulses 39 which occurs at the transition of each character position coming into alignment with the printing position is one for which RCOM is low. By the time the second CP signal 40 falls, RCOM has gone high.

FIGS. 6A and 6B is a schematic diagram of the first preferred embodiment of the present invention. As noted above, the preferred embodiment is connected to a multiconductor plug attached to the board embodying printer interface and driver 27 (FIG. 2). In the preferred embodiment, sixteen input pins designated 50a-50s are shown. These are, for the architecture of the preferred embodiment, grouped into two groups of eight, 50a-50h, 50i-50p, and one group of three, 50q-50s. Input connectors 50a-50s comprise the input port of the intelligent data acquisition interface of the preferred embodiment.

Each of the input pins 50 is connected to one of an identical set of buffer amplifiers, each shown as 51 on FIG. 6A. It should be appreciated that all buffer amplifiers 51 are shown as blocks with the exception of the particular buffer amplifier circuit surrounded by a dashed line designated 51'. Circuit 51' is connected to input 50p and shows the detail of each of blocks 51 shown on FIG. 6A.

Turning for a moment to buffer circuit 51, comparator 52, preferably embodied by one comparator of a type LM339 quad comparator circuit, is used. Its noninverting input is connected to line 55. Line 55 is in turn connected to a T connected arrangement of resistors 56 for establishing a threshold voltage for comparator 52. As indicated by the notation by line 55, this common threshold voltage is attached to the noninverting input of each of the comparators within buffer circuits 51. This particular connection is not shown on FIG. 6A for the sake of simplicity and since its implementation and will be readily apparent to those skilled in the art. A feedback resistor 57 and an input resistor 58 to the noninverting input of comparator 52 provide positive feedback. The entire arrangement will be recognized as one implementing a comparator with hysteresis.

The output from each of comparator circuits 51 is attached to one of a plurality of conventional pull-up resistors 59. The outputs of comparators 51 attached to input connectors 50a-50h are provided as eight inputs to a buffer line driver 60. Line driver 60 is preferably embodied by a type 74C244 octal buffer/line driver with three state outputs. The eight outputs from octal buffer 60 form an eight bit bus 61. The outputs from buffers 51 connected to input pins 50i-50p form a second eight bit bus 62.

The preferred embodiment of the present invention is controlled by a type 6803 microprocessor 65. In the preferred embodiment, processor 65 is implemented by a type HD63A03 processosr manufactured by Hitachi. It will be understood by those skilled in the art that this is a CMOS pin-for-pin equivalent of the type MC6803 originally manufactured by Motorola Semiconductor Products Inc. (Microprocessor Division) of Austin, Tex. Detailed descriptions of the internal workings of a type 6803 processor are contained in "Motorola Microprocessors Data Manual", publication DL-120 (Second Edition 1981), which is hereby incorporated by reference. Thus, while the above-referenced work contains a detailed description of the internal structure and operation of this device, a few salient features, necessary to understand the workings of the present invention, will be pointed out.

First and foremost, the microprocessor 65 contains one hundred twenty-eight eight-bit bytes of internal random access memory (RAM). As will become apparent from the following description, a portion of this memory is used as a twenty byte buffer in the preferred embodiment. In the particular mode of operation adopted in the preferred embodiment (mode 2), the internal RAM lies between hexadecimal addresses 0080 and 00FF of the address space of processor 65.

Those skilled in the art will be familiar with the various options for operating a type 6803 processor. Among those implemented in the preferred embodiment is the option of defining pins P23 and P24 of port 2 of the processor as serial I/O pins. This arrangement is adopted in the preferred embodiment. Additionally, pin P22 of port 2 can be, and is in the preferred embodiment, configured to generate interrupts for the 6803.

The architecture of the type 6803 is port oriented with various internal registers accepting data which configures operation of the ports. In mode 2, the mode in which it is operated in the preferred embodiment, port 3 is defined as a multiplexed data and address bus wherein the port will read in eight bits of data during read operations and write out the eight lowest significant bits (A0-A7) of the system address during read and write operations. In this configuration, port 4 (pins P40-P47) provide the eight most significant bits (A8-A15) of the address.

In the preferred embodiment, a program memory 66 is provided. This is preferably embodied as a type 2716 2K by eight-bit programmable read only memory (ROM or PROM). The program memory includes the program instructions to implement the program logic controlling microprocessor 65 as well as at least one ECR specific table for providing a plurality of ECR specific character values. As used in this specification, a table of ECR specific character values refers to a table which maps a particular row and column position from the printer of a particular ECR into an ASCII character or a token character as described above. Thus, it will be appreciated that the remaining circuitry of the preferred embodiment shown on FIGS. 6A and 6B, may be used with a wide variety of ECRs by only changing the data within program memory 66. As will be known to those skilled in the art, such changes are commonly accomplished by programming a plurality of physical read only memories, each containing ECR specific values for one of a plurality of ECRs with which the preferred embodiment can operate, and allowing the user to simply select the appropriate ROM to be plugged in, depending on the ECR to be used. This gives the further advantage of users of the present system that they may change the types of ECRs used at their place of business without having to acquire new, custom-designed interfaces for the ECRs and the utilization system which has already been purchased.

Next, the remaining components of the preferred embodiment will be described prior to a description of the operation of the preferred embodiment. Eight-bit bus 61 is provided as eight input lines to a type 74HC373 octal transparent latch 67. The outputs from latch 67 are provided as an eight-bit bus 68 to the eight lowest order address bits of ROM 66. A parallel tap to eight-bit bus 61 is made by eight-bit bus 69 which in turn is provided as the eight inputs, shown as 70, to port 3 of microprocessor 65. Additionally, a corresponding eight-bit bus 71 takes the D0-D7 data outputs of ROM 66 to input 70 at port 3 of microprocessor 65. It will be readily understood by those skilled in the art that the buses 61, 69, and 71, together with the eight-bit input 70, are electrically identical and form an eight-bit bus configuration. Each is given a separate reference numeral for convenience so that the portion of the bus referred to will be understood from the context of this specification.

As noted above, the preferred embodiment configures the type 6803 microprocessor 65 in its number 2 operating mode. Under these conditions, port 4 (pins P40-P47) carries the eight most significant address bits of the system address. The three least significant bits 72 from port 4 are provided to address inputs A8-A10 of ROM 66. Thus it will be appreciated that the combination of bus 68 and three address bits 72 are combined to form an eleven-bit address bus 76 for read only memory 66. As will be understood by those skilled in the art, the three address lines 72 from processor 65 need not be latched in operating mode 2.

The outputs of buffers 51 connected to input pins 50q-50s appear on lines 78-80. These are provided as the Y inputs to a type 4053 multiplexer 81. The X inputs to multiplexer 51 are provided by the mode configuration circuitry shown within dashed line 82. This circuitry is conventional in nature. The outputs from multiplexer 51 appear on lines 85-87 which are connected to pins P20-P22, respectively, of processor 65.

As noted above, the preferred embodiment operates the type 6803 processor 65 in its defined mode 2 of operation. The mode of operation of a type 6803 processor is determined by the bit values present on lines P20-P22 during a reset operation. Resistors 88 and 89 act as pull-up resistors within mode configuration circuitry 82. Each of these is connected, respectively, to points 90 and 91 which are in turn, respectively, connected to inputs Cx and Bx of multiplexer 81. Line 92, connected to Ax of multiplexer 81, is connected to ground. A pair of jumper locations, shown as 95 on FIG. 6, are provided so that different modes may be used in other embodiments of the present invention or in embodiments using a processor other than the 6803. Suffice it to say that, in the preferred embodiment, jumper 96 is provided. Thus, the logical states of points 90 and 91 and line 92, together with their connections to the inputs to mux 81 show that, when the x inputs of the mux are tied to lines 85-87, the binary number 010 will be provided on pins P20-P22, respectively. This, upon the occurrence of a reset, configures processor 65 in its mode 2 of operation.

In the remainder of configuration circuitry 62, it will be appreciated that reset circuitry 82 and the above-described connection from x inputs of multiplexer 81 to lines 85-87 is operative during a power-up of the preferred embodiment. A capacitor 97 charges through resistor 98 with a time constant that allows an appropriate number of machine cycles to occur prior to the voltage at point 99 crossing the logical threshold defined for inputs to processor 65. A low voltage at point 99 provides a low voltage at reset input 100 to processor 65 as well as a low voltage on select inputs 100 to multiplexer 81.

Diode 101 is provided to allow capacitor 97 to discharge rapidly in the event of a power failure to assure that a reset will occur properly if system power is lost.

The master clock for a preferred embodiment is controlled by crystal 110 which, in the preferred embodiment, is a 4.9152 megahertz crystal.

Assuming for a moment that power-up has occurred, input 100 will be high, select inputs 102 will connect lines 78-80 to lines 85-87, respectively. As noted above, eight lines 62 are connected to port 1 of processor 65 and, when the outputs of buffer driver 60 are in their low impedance state, the input lines from the inputs to buffer 60 will be connected through buses 60 and 69 to inputs 70 for port 3. Under these conditions, it will be appreciated that the state of the character position timing signals present on inputs 50a-50p will be provided to ports 1 and 3 of processor 65. The remaining three inputs from connections 50q-50s will be provided to pins P20-P22 of port 2.

The address multiplexing and data acquisition shown on the balance of the preferred embodiment is substantially conventional. An address decoder is shown as surrounded by dashed line 115. This decodes the outputs of pins P64 and P67 which are, respectively, address lines A14 and A15 for the 6803. From observation of address decoder 115, the following will be appreciated. NAND gate 116 decodes address state 11 for the two most significant bits of the system address. This provides a logical zero on line 117 to the negated chip enable input 118 of PROM 66. Thus, whenever data is being accessed from PROM 66, the two most significant bits of the system address will be high. Whenever a logical one is present on line 117, the D0-D7 outputs of PROM 66 on bus 71 will be in their high impedance state thus preventing bus 71 from loading input 70 to port 3.

The combination of inverter 119 and NAND gate 120 decodes the 01 state of the two most significant address bits to provide a 0 on line 121. Line 121 is provided as one input to bus control decoder 125 enabling the bus control decoder 125 to address the data present on bus 61 as input data for port 3.

In the embodiment of FIGS. 6A and 6B, addresses for which the two most significant address bits are 10 are not used, and addresses for which these bits are equal to 00 are used to address the internal RAM within processor 65.

Bus control decoder 125 provides appropriate signals on lines 126 and 127 to arbitrate access to the various eight-bit buses to input 70 of port 3. NAND gate 128 has the enable (E) and the read/not write (R/W) signal on line 129 provided as inputs. As known to those skilled in the art, the enable signal from the type 6803 is a slightly skewed version of the system clock frequency determined by crystal 110.

Line 129 from the read/write input goes high during an appropriate time for data to be read from either of data buses 69 or 71. Thus, at the appropriate time for reading, line 130 will go low causing a corresponding low going signal to appear on line 126. When PROM 66 is being addressed, indicated by a logical zero on line 117, the low on line 126 enables the outputs of PROM 66 connecting the outputs to bus 71. Thus, the word from PROM 66 is read back to input 70 of port 3. Of course, when line 117 is high, indicating that PROM 66 is not being addressed, the data outputs of PROM 66 will be in their high impedance state.

When data from bus 61 is being read into port 3, line 121 from address decoder 115 will be low. Inverter 131 will invert this low condition to provide a logical one at input 132 of NAND gate 135. Under these conditions, the low going pulse on line 130 is inverted by inverter 136 to cause a logical zero to appear on line 127. Note that the assumption of a logical zero on line 121 precludes the possibility of line 117 being low and thus the outputs of PROM 66 are removed from the bus. The low on line 127 connects the outputs of buffer circuits 51 connected to input lines 50a-50h to bus 61. Bus 61 is, in turn, connected by bus 69 to input 70 of port 3.

Thus, the combination of address decoder 115 and bus control decoder 125 arbitrate access to port 3 of the microprocessor so that either data from PROM 66 or from the inputs connected to buffer driver 60 may be read to this port.

Whenever PROM 66 is being addressed, the lower order address bits are multiplexed. This condition necessarily requires a logical one on line 121, thus assuring that a logical one will be present on line 127. Thus, the outputs of buffer 60 will be in their high impedance state and this buffer will be effectively removed from the bus.

The microprocessor 65 will write out the eight lowest order address bits from port 3 onto bus 69. When the address strobe appearing on line 138 goes low, the eight lowest order bits for PROM 66 are latched into latch 67, and thus become latched onto bus 68. The three address lines 72 will carry the three highest order address bits for PROM 66 and, at the appropriate time, the low going signal on line 126 will enable the outputs of the PROM allowing the output word to be read back onto bus 71.

The remaining circuitry on FIG. 6 is the communications arrangement for implementing communication link 21 (FIG. 1). As noted above, pins P23 and P24 are user configurable for the type 6803 into serial input and serial output lines, respectively. The serial in and serial out data lines are shown as 21 on the right-hand side of FIG. 6B. The serial in line appears on line 140 and is provided through a line driver 141 to input P23.

The output from P24 goes through a second line driver 142 to the base of a transistor 145. Transistor 145 operates as a switch for LED 146 of an optocoupler 147. Thus, when transistor 145 turns on, current flows through LED 146. This turns on photosensitive transistor 148 within optocoupler 147 providing base drive to an output transistor 149. The collector of transistor 149 is connected to point 150 which is electrically identical to serial output line 151. It will be appreciated from the foregoing overall description of the serial output that a logical inversion takes place between pin P24 and line 151. Thus, the program memory within PROM 66 is configured to cause processor 65 to provide the logical inverse of the serial bits it wishes to transmit over communications link 121 as outputs to pin P24.

The preferred embodiment also includes an arrangement wherein communication from pin P24 can be provided to a conventional 20 milliampere current loop 152. A polarity steering full wave bridge 155 is provided when the current loop option is selected. In order to provide the current loop arrangement, jumpers 156 and 157 are removed. It will be appreciated by those skilled in the art that this arrangement removes power from the serial output line 151 and causes output transistor 149 to control the flow of current through loop 152.

Turning next to FIG. 7, the operation of the embodiment of FIGS. 6A and 6B in collecting data from a set of character position timing signals such as those shown in FIG. 5A, will be explained. FIG. 7 is a flow diagram of the logic of the program instructions contained in PROM 66. In considering the foregoing description of the circuitry of FIG. 6 and the timing signals of FIG. 5A, the information contained on FIG. 7 can be fully understood. The following table presents the names of the variables shown on FIG. 7 and a definition of each variable.

TABLE

CPCNT (character position count), a counter counting the character position pulses derived from the printer, see line 36 of the timing diagram of FIG. 5A.

ARCNT (active row count), a counter value counting the number of character positions (rows, see FIG. 3) that have passed since the printing cycle for printing a complete print line commenced.

COLCNT (column count), a variable which counts the number of shifts that have occurred for examining data from each column, one bit at a time, after an entire row of data has been read into the microprocessor.

T1 (temporary variable), a variable generated as a function of the column count and the row count variables when an active condition at a particular row and column of the print wheel diagram of FIG. 5A is detected. It is used as an address for the ECR specific look-up table for the particular ECR in use.

LKUP (look-up). This is the data stored in the look-up table at the address defined by T1. It is ECR specific.

ST (state). This is a value into which LKUP is loaded. In the preferred embodiment, LKUP and ST are always either standard ASCII encoded data or tokens.

BUFAD (buffer address). This is the address in the twenty byte buffer contained in internal RAM in the 6803. It is determined by the column count for which an active print condition was detected. This is because the column count bears a one-to-one relationship with the position of a character within the printed line in a complete print row (see FIG. 4).

ARCNTMAX. This is an ECR specific constant for the maximum acceptable value of the active row counter variable ARCNT. It is fetched from program memory 66 upon reset and used thereafter. It is equal to the maximum number of rows, and thus characters, on each print wheel.

RP (reset pulse). This is a Boolean variable which appears on line 86 to input pin P21. It is the synchronizing signal shown on line 37 of the timing diagram of FIG. 5A.

RCOM. This is a Boolean variable which appears on line 85 as an input to pin P20. It is, in the example discussed, the signal shown on line 35 of the timing diagram of FIG. 5A.

Turning next to FIG. 7, the flow chart for controlling the data acquisition routine defined by the program memory in PROM 66 is described. As noted above, the preferred embodiment configures the 6803 microprocessor 65 in an operating mode in which pin P22 is used to generate an interrupt upon a transition of a particular sense. As can be seen from FIG. 6, the line carrying the character pulses CP (lines 36, FIG. 5A) is connected through multiplexer 81 to line 87, and thus to pin P22.

Thus, each occurrence of a character pulse generates an interrupt. This causes the processor 65 to go through its interrupt service routine, and eventually enter the data acquisition operation at step 210, as shown on FIG. 7. The first operation is to increment the value of the character pulse counter CPCNT which takes place at step 211.

Next, the value of RP is read from pin P21 at step 212. Decisional step 215 tests to see if RP is equal to one, indicating that a reset pulse has occurred. If this has happened, YES branch 216 is taken from step 215 to step 217 at which character pulse counter variable is cleared. From this point, the processor steps to step 218 in which the value of the variable RCOM is read from pin P20.

If the test at step 215 is negative, branch 219 is taken to step 218.

It should be noted that, while steps 212 and 218 are indicated as individual read steps, the logic controlling processor 65 actually causes the value of port 2 to be read as part of the interrupt service routine. Since the value for variables RP and RCOM are on pins of port 2, the word written in at this port is shifted in internal registers to test for the values of the appropriate bits. This is physically how the logical steps 212 and 218 are implemented.

Once the value of RCOM is acquired, its state is tested at decisional step 220. If its value is zero, NO branch 221 is taken to exit point 22. As may be seen from FIG. 5B, every other character pulse is one for which RCOM is low at the trailing edge of the character pulse. It should further be noted that branching to exit upon RCOM equals zero is also appropriate for printers of the type for which RCOM goes high and remains high for the entire cycle of printing a complete print line.

If RCOM is equal to one, YES branch 225 is taken from step 220. The direct stepping from branch 225 to step 230 shown in FIG. 7 is one which is appropriate for printers of the type in which RCOM goes high and remains high as opposed to being pulsed as shown in FIG. 5A. Thus, an ECR specific program step for a printer producing the character position timing signals shown in FIG. 5A should be included in place of branch 225. This is indicated in phantom as decisional step 226. Step 226 tests the parity of the character pulse counter variable. Upon a determination that the variable is odd, the YES branch shown as step 225' is taken to step 230. In the event the variable is even, NO branch 227 is taken to an exit. This is because, for the type of printer discussed in connection with the main example, two character pulses are generated for each stepping between contiguous character (row) positions.

At step 230, the active row counter variable (ARCNT) is incremented. As may be seen from the foregoing table, this variable keeps track of the number of active rows which have passed the print position during the current process of printing an entire print line. When this has occurred, processor 65 reads ports 1 and 3 at step 231. Turning for a moment to FIG. 6, this corresponds to reading the state of the sixteen input lines on connector pins 50a-50p. In the particular main example discussed, only fourteen of these lines will be used since the printer in question contains fourteen column positions defined by the fourteen print wheels (see FIG. 3).

Once ports 1 and 3 have been read, the decoding subroutine of the data acquisition program 235 is entered. Note that for each reading of ports 1 and 3, subroutine 235 is executed. From the foregoing description, it will be appreciated that routine 235 processes an entire row of data each time it is executed. Turning for a moment to FIG. 5A, it will be appreciated that this corresponds to a parallel reading in of the values of each of the receipt hammer signals shown in any one column under one of the positive pulses of the RCOM signal shown on line 35.

Within subroutine 235, the data read in and parallel from ports 1–3 is shifted according to the instruction set for the 6803, so that the values read in are tested one bit at a time. The routine begins with step 235 which clears the variable COLCNT. A predetermined bit position within an internal register into which the data at one of the ports was read is referred to as "bit" in FIG. 7. Its active state is a ECR specific variable which will be equal to either one or zero, and corresponds to the logical value which will activate a particular receipt hammer or print wheel pawl to determine which character is going to be printed. As may be seen from FIG. 5A, the active level is logical zero for the main example.

Once the COLNT variable has been cleared, a loop is entered which tests each column of the particular row read for an active bit value. This begins with step 237. If the particular bit within the register is not active, NO branch 238 is taken to step 239 at which a shift in an appropriate direction takes place in the register within processor 65. When this is completed, the value of COLCNT is tested for overflow at step 240. Of course, step 240 may be implemented by testing the variable against an ECR specific variable defining the number of columns (print wheels) for the particular printer in use. Until the column count variable indicates that all columns for the particular row have been tested, NO branch 241 will be taken, completing the loop and bringing the program back to decisional step 237.

Upon each occurrence of detection of an active bit at the bit position being tested in this shifting loop, YES branch 242 is taken. First, variable T1 is determined by the program at step 245. As noted on FIG. 7, variable T1 is a function of the column count and the character pulse count and thus corresponds to the particular element of the two-dimensional array shown in FIG. 3 for which an active print signal was provided. When this is completed, step 246 is executed. In this step, the state variable ST is loaded with a value of a function referred to as LKUP (look-up) of the variable T1. This corresponds to loading a register holding the value ST with a value determined from the ECR specific look-up table included in PROM 66 (FIG. 6).

As noted in the table above, the variable ST is preferably an ASCII coded character or a token corrresponding to a print wheel character which is not defined by the ASCII character set. When this step has been completed, the variable ST is stored in a location within the buffer memory of processor 65 at step 247. As noted on FIG. 7, the buffer address is a function of the column count variable. This is because, in the preferred embodiment of the contents of the twenty byte buffers transmitted serially, in the same order each time it is transmitted. Since the value of the column count variable COLCNT corresponds to the particular print wheel which received an active signal, it will be readily appreciated by inspection of FIG. 4, that the column count variable corresponds to a position within the actual characters printed on a receipt, as shown in FIG. 4. Thus, the buffer address is a function of the column count and properly positions the ASCII encoded character in a position corresponding to where it appeared on the printed receipt provided by the ECR. When this has been done, branch 248 brings the program to step 239 causing the shift described hereinabove.

It should be noted that it is appropriate to execute the entire routine 235 each time a row of data is read in since multiple columns may be activated, at the same time, for each row of data. An example of this is shown as the stars printed in columns 11 and 12 for row C on the timing diagram of FIG. 5A.

When all of the columns of the particular row read in at step 231 have been tested by subroutine 235, the program exits subroutine 235 via branch 249. Exit along line 249 indicates that an entire row of data, corresponding to all the print wheels passing a particular position, have been read by processor 65, analyzed for active print signals, and that appropriate ASCII encoded state values are stored in the buffer of processor 65. In other words, one entire print position for all of the print wheels have been analyzed. This is referred to one active row.

At step 250, the value of the active row counter variable ARCNT is tested against its maximum value. As noted above, the maximum value corresponds to the complete number of print positions on each wheel. Variable ARCNT reaching its maximum value means that an entire rotation of the print wheels has taken place.

If the maximum value has not been reached, this means that the printing of an entire print line is still in progress. Thus, NO branch 251 is taken to an exit back to the main program operating processor 65. Under these conditions, the processor does other work until the next interrupt is generated on pin P22 causing the acquisition routine to be entered at step 210.

When all the rows for a complete revolution of the print wheels have been analyzed, ARCNT will reach its maximum value ARCNTMAX and YES branch 252 will be taken from step 250. When the program takes YES branch 252, this occurrence defines the existence of a complete line signal condition. This condition occurs when all of the character positions on the print wheels have been analyzed, as described hereinabove, and the contents of the buffer corresponds to a complete printed row of information on the paper tape of the electronic cash register to which the preferred embodiment is attached. The active row counter is cleared at step 255. When this is accomplished, a subroutine indicated as transmit buffer contents is executed at step 256. As noted above, the operating mode for the 6803 employed in the preferred embodiment is one which contemplates and defines appropriate routines for serial transmission of data out from pin P24. Thus, the implementation of subroutine 256 will be apparent to those skilled in the art. Once subroutine 256 is completed, the buffer is cleared at subroutine 257 and the program is exited at 258.

The foregoing has been a complete description of the preferred embodiment of the present invention as used in connection with the specific type of ECR described in connection with FIGS. 3–5. The balance of this specification shows the general applicability of the present invention as an interface with other types of ECRs. Turning next to FIG. 8, a timing diagram for the above-mentioned second type of printer used with a different type of ECR is shown. In particular, FIG. 8 shows a timing diagram of signals available from an Epsom CR-340 digital printer used in a number of electronic cash registers today.

As described hereinabove, this type of cash register is one in which all print wheels start each print operation from a predetermined home position. The wheels are rotated in a predetermined direction until an active signal is received for a particular print wheel causing a pawl to engage a ratchet on the print wheel bringing it to a halt. When all the wheels have had an opportunity to rotate to their position of maximum rotation, a platen strikes the assembled line of print causing all characters to be printed on the receipt simultaneously. The cycle is then completed by releasing the pawls allowing the wheels to return to the home position.

In FIG. 8, the timing diagram shows variables which are indicated by terms adopted with the convention of FIG. 5 as well as shown terms defined by the manufacturer. While the physical operation of the printer is different from that shown in the main example, it will be appreciated from inspection of FIG. 8 and FIG. 7 that the same logic may be used to decode the data in precisely the same fashion. In the case of the example of this second type of printer, it is the setting of a pawl stopping each print wheel which corresponds to activation of a hammer magnet in the main example.

The same logic shown in the flow diagram of FIG. 7 will generate the same information (assuming the appropriate ECR specific values are included from the ECR specific table) as with the first type of printer. The only changes necessary are as follows. First, of course, step 226 is omitted, since only one character pulse (CP) is generated by the printer for each step between contiguous print positions on the wheels. Also, the RCOM signal (print) in the example of FIG. 8 is active low, and thus step 220 should have its logic inverted.

Since printers of the type described by FIG. 8 initiate all printing operations with all character wheels of the same position, it is not necessary to separately keep track of the variable CPCNT and ARCNT. However, nothing is lost in doing so, and the stop signal shown on the timing diagram of FIG. 8 can be inverted and used to replace the variable RP without affecting the outcome of the program.

Thus it may be seen that the same logic may be used to acquire and decode data from printers having substantially different operating principles. It should further be noted that the particular logic values to which variables RP and RCOM are compared at steps 215 and 220 (FIG. 7), may be made ECR specific variables, thus allowing embodiments of the present invention to be constructed using identical program logic for different types of printers.

From further inspection of FIG. 8, it should be understood that each of the signals shown as R1-RM is a signal which goes active low indicating that a pawl is to be inserted in the print wheel when the particular position shown is reached. From consideration of the foregoing description and the timing diagram shown in FIG. 8, it will be understood that exactly the same result is achieved with printers of the type described in FIG. 8 as with those described in FIG. 5A.

Turning next to FIG. 9, an alternate embodiment of the circuitry of the present invention is shown. This embodiment is particularly useful in connection with embodiments of the invention designed to be used with an electronic cash register using dot matrix printers. In FIG. 9, only changes to the circuitry of FIG. 6 are shown.

In embodiments of the present invention designed to be used with ECRs equipped with dot matrix printers, a lesser number of parallel input signals are required than for the embodiments discussed in connection with FIG. 6. Thus, it is preferred to directly connect mode control circuitry 82 directly to pins P20-P22. Since this use is made of these three pins, the negated interrupt request input 165 is used in the embodiment of FIG. 9. A NAND gate 166, configured as an inverter, together with a switch 167 is used to determine the polarity of a transition appearing on line 168 which generates each interrupt. Line 168 is one element of bus 62 shown in FIG. 6.

In addition to address decoder 115 (the details of which are shown in FIG. 6), the unused combination of bits A14 and A15 discussed in connection with the embodiment of FIG. 6 is decoded by decoder 169 in the embodiment of FIG. 9. This is used to provide a logical zero on line 170 when this block (A14 =1, A15 =0) of the address space of processor 65 is being addressed. A portion of this part of this system address space is dedicated to a 2K by random access memory 171 which is also used in the embodiment of FIG. 9. It is preferably embodied by type HM6116 random access memory. The ten input address lines to RAM 171 are implemented by simply extending bus 76 in a tap shown as 76' in FIG. 9. Similarly, the eight output bits from RAM 171 are provided on a bus tap shown as bus 71' directly connected to bus 71 (as shown on FIG. 6) which goes to port 3 of processor 65.

Line 126 from bus decoder 125 is also connected to a negated output enable input 175 for RAM 171 since a negative going signal on this line is a logical combination of the enable signal (E) and a read signal from the read/not write output of processor 65. The read/not write signal from the processor is extended on line 176 and directly connected to a corresponding read/not write input 177 on RAM 171. The combination of the decoded address signal on line 170 and the enable signal from processor 65 is detected by inverter 178 and NAND gate 179 and provided to an chip enable input 180 on RAM 171.

Additionally, address A13 appearing at pin P45 is brought out on line 181 to an A11 input 182 of EPROM 66'. As shown on FIG. 9, EPROM 66' used in the embodiment of FIG. 9, is a type 2732 4K by eight PROM and thus has twice the capacity of EPROM 66 shown in FIG. 6.

Otherwise, the embodiment of FIG. 9 is electrically identical to the embodiment of FIG. 6. In operating the embodiment of FIG. 9, random access memory 171 is used to download data from the utilization system to which the device is connected. Of course, if a current loop connection is used (as described in connection with FIG. 6), a two-wire pair for the input current loop must also be provided. However, in this embodiment, upon power up, the instructions in program memory 66' instruct the processor to determine if it has valid data stored in RAM 171. This is done in order to check if data was lost during momentary power outages which were of sufficient duration to cause the processor 65 to reset. If the data is inadequate, the instructions in program memory 66 cause processor 65 to communicate with the utilization system indicating that it needs to have ECR specific data loaded into RAM 171. The utilization system shoud be configured to respond by serially transmitting the necessary information. Processor 65 accepts this data in bit serial form through pin P23 (FIG. 6) and organizes it into eight-bit words which are written out to RAM 171. From this point on, operation continues as described above.

As noted above, embodiments of the present invention designed to be used with ECRs and point dot matrix printers do not require the large number of parallel inputs onthe interface input port described in connection with the embodiment of FIG. 6. One such embodiment has been constructed by tapping an eight-bit parallel data bus provided from the ECR's printer interface device and three control lines. The three control lines are gated on an external board to provide a gated signal to the particular line of the input port connected to line 168. Thus, the interrupts are generated by reading an appropriate eight-bit word corresponding to a particular character. In another embodiment, data is provided in bit serial form directly from a printer interface to a character generator contained in the dot matrix printer. In view of the foregoing teachings of the specification, it is then the level of skill in the art to provide ECR specific instructions in program memory 66' to appropriate deserialize and decode data of this type.

For example, in dot matrix printers, it is known that the data provided to the printer is, of necessity, in character serial form and thus, the beginning of a print cycle corresponds to a particular home position for the matrix printer head. From this point on, as characters are received, they may be decoded and placed in the buffer of processor 65. An end of the print line signal can be detected in the form of a paper advance and/or signal causing the carrier for the matrix printer head to be returned to the home position. This corresponds to detection of the maximum row count described in connection with FIG. 7.

In view of the foregoing description of several embodiments of the invention, other embodiments of the present invention will suggest themselves to those skilled in the art. Thus, the scope of the present invention is to be limited only by the claims below.

What is claimed is:

1. An intelligent data acquisition interface for interfacing an electronic cash register to a utilization system comprising in combination:
   input means for connecting an input port of said interface to said electronic cash register and for providing a plurality of character position timing signals to said input port;
   a program memory including a plurality of program instructions and at least one ECR specific table for providing a plurality of ECR specific character values;
   a processor including a buffer memory connected to said input port and to said program memory for providing and storing a plurality of state signals, each of said state signals corresponding to a particular character printed by said electronic cash register, in said buffer memory in response to said character position timing signals and to said ECR specific character values, and for providing a complete line signal condition in response to said character position timing signals; and
   communication means connected to said processor and said utilization system for transmitting said state signals to said utilization system in response to said complete line signal condition.

2. An intelligent data acquisition interface as recited in claim 1 wherein said ECR specific table provides a specific ASCII code pattern as one of said state signals in response to each of said character position timing signals.

3. An intelligent data acquisition interface as recited in claim 2 wherein said communication means comprises an asynchronous serial data link.

4. An intelligent data acquisition interface as recited in claim 1 wherein said processor is responsive to said program instructions and said character position timing signals to provide a counter for counting each occurrence of a particular one of said character position timing signals and to provide said complete line signal condition in response to said counter counting a predetermined number of said occurrences.

5. An intelligent data acquisition interface as recited in claim 4 wherein said counter is a first counter and said processor is further responsive to said program instructions to provide a second counter for counting said each occurrence of said particular one of said character position timing signals and to reset said second counter in response to each receipt of a reset pulse as one of said character position timing signals.

6. An intelligent data acquisition interface as recited in claim 5 wherein said processor determines each of said plurality of state signals in response to a particular one of said character position timing signals correponding to a particular print row and the count of said counter at a time of occurrence of said particular one of said character position timing signals corresponding to said particular print row.

* * * * *